US006633842B1

(12) United States Patent
Gong

(10) Patent No.: US 6,633,842 B1
(45) Date of Patent: Oct. 14, 2003

(54) SPEECH RECOGNITION FRONT-END FEATURE EXTRACTION FOR NOISY SPEECH

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 489 days.

(21) Appl. No.: 09/666,987

(22) Filed: Sep. 21, 2000

Related U.S. Application Data

(60) Provisional application No. 60/161,175, filed on Oct. 22, 1999.

(51) Int. Cl.$^{7}$ .............................................. G10L 15/20

(52) U.S. Cl. ....................................... 704/233; 704/256

(58) Field of Search ................................ 704/231, 222, 704/226, 233, 241, 242, 250, 286

(56) References Cited

U.S. PATENT DOCUMENTS 5,583,961 A * 12/1996 Pawlewski et al. ......... 704/241
5,924,065 A * 7/1999 Eberman et al. ............ 704/231
6,188,982 B1 * 2/2001 Chiang ........................ 704/256
6,202,047 B1 * 3/2001 Ephraim et al. ............ 704/256
6,205,424 B1 * 3/2001 Goldenthal et al. ......... 704/247
6,438,513 B1 * 8/2002 Pastor et al. ................ 702/191
6,445,801 B1 * 9/2002 Pastor et al. ............... 381/94.2
6,449,594 B1 * 9/2002 Hwang et al. .............. 704/233

* cited by examiner

*Primary Examiner*—Susan McFadden
(74) *Attorney, Agent, or Firm*—W. James Brady, III; Frederick J. Telecky, Jr.

(57) ABSTRACT

An estimate of clean speech vector, typically Mel-Frequency Cepstral Coefficient (MFCC) given its noisy observation is provided. The method makes use of two Gaussian mixtures. The first one is trained on clean speech and the second is derived from the first one using some noise samples. The method gives an estimate of a clean speech feature vector as the conditional expectancy of clean speech given an observed noisy vector.

9 Claims, 1 Drawing Sheet

SPEECH RECOGNITION FRONT-END FEATURE EXTRACTION FOR NOISY SPEECH

This application claims priority under 35 USC§119(e)(1) of provisional application No. 60/161,175, filed Oct. 22, 1999.

FIELD OF INVENTION

This invention relates to speech recognition and, more particularly, to feature extraction for noisy speech.

BACKGROUND OF INVENTION

A speech recognizer operates with a suitable front-end which typically provides a periodical feature vector every 10–20 milliseconds. The feature vector typically comprises mel-frequency cepstral coefficients (MFCC). See, for example, S. B. Davis and P. Mermelstein, "Comparison of Parametric Representation for Monosyllabic Word Recognition in Continuously Spoken Sentences," *IEEE Transaction Acoustics, Speech and Signal Processing*, ASSP-28(4) 357–366, August 1980.

Operating in acoustic environments under noisy background, the feature vectors such as MFCC will result in noisy features and dramatically degrade the speech recognition. See, for example, applicant's article (Y. Gong) entitled "Speech Recognition in Noisy Environments: A Survey," *Speech Communication*, 16 (3): 261–291, April 1995.

It is highly desirable to provide a method or apparatus to reduce the error rate based on a noisy feature vector. Earlier work in this direction to reduce the error rate includes vector smoothing. See H. Hattori and S. Sagayama entitled "Vector Field Smoothing Principle for Speaker Adaptation," *International Conference on Spoken Language Processing*, Vol. 1, pp. 381–384, Banff, Alberta, Canada, October 1992. Another earlier work in the same direction is statistical mapping as described by Y. M. Cheng, D. O'Shaughnessy and P. Mermelstein entitled "Statistical Signal Mapping: A General Tool for Speech Processing," in *Proc. of 6th IEEE Workshop on Statistical Signal and Array Processing*, pp. 436–439, 1992. Another work in the same direction is base transformation described by W. C. Treurniet and Y. Gong in "Noise Independent Speech Recognition for a Variety of Noise Types," in *Proc. of IEEE International Conference on Acoustics, Speech and Signal Processing*," Vol. 1, pp. 437–440, Adelaide, Australia, April 1994. Another work in the same direction is code-dependent cepstral normalization described by A. Acero in "Acoustical and Environmental Robustness in Automatic Speech Recognition," Kluwer Academic Publishers, 1993.

All of these prior art works require noisy speech database to train the relationships and they assume that the parameters of the noise encountered in the future will be a replica of that of the noise in the training data.

In practical situations such as speech recognition in automobiles, the noise statistics change from utterance to utterance, the chance that noisy speech database that adequately represents the future environment is low. Therefore, the applicability of any method based on training on noisy speech data is limited.

SUMMARY OF INVENTION

In accordance with one embodiment of the present invention, a method to obtain an estimate of clean speech is provided wherein one Gaussian mixture is trained on clean speech and a second Gaussian mixture is derived from the Gaussian mixture using some noise samples.

The present method exploits mapping noisy observation back to its clean correspondent using relationships between noise feature space and clean feature space.

DESCRIPTION OF THE PREFERRED EMBODIMENTS OF THE PRESENT INVENTION

Figure 1:
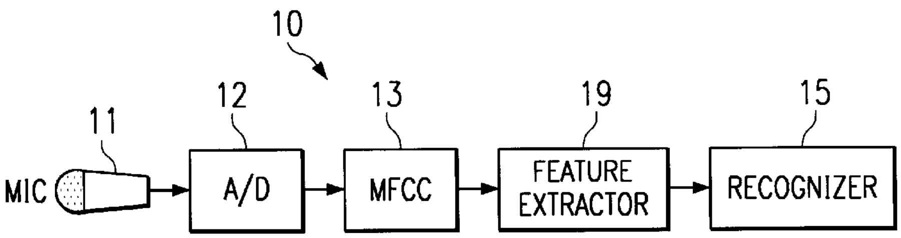
FIG. 1 is a block diagram of a recognizer according to one embodiment of the present invention.

Referring to FIG. 1, there is illustrated a speech recognizer system 10. The incoming speech is received by a microphone 11 and is converted to digital data speech frames at analog-to-digital converter 12. The converter 12 samples the incoming speech signals and converts the samples to digital data. The speech frames are applied to a Mel-Frequency Cepstral Coefficient (MFCC) processor 13 where a frame or token is converted to a feature vector. A set of feature vectors from a set of frames is then applied to front end feature extractor processor 19 according to the present invention to produce an estimated clean MFCC which is a new set of feature vectors. This is applied to the recognizer 15. The recognizer 15 is responsive to the new feature vectors to produce recognized speech based on statistical probabilities. See, for example, U.S. Pat. No. 5,146,539 of Doddington, et al., entitled "Method for Utilizing Formant Frequencies in Speech Recognition", incorporated herein by reference. The recognizer 19 may be similar to that following the formant selector 38.

In accordance with the present invention, a method to obtain an estimate of clean speech feature vector given its noisy observation is provided. The method makes use of two Gaussian mixtures wherein the first is trained off-line on cleaned speech and the second is derived from the first one using some noise samples. The method gives an estimate of a clean speech feature vector as the conditional expectancy of clean speech given an observed noisy vector. The method uses the estimation of clean vector from noisy observation and probability density function as determined below.

Estimation of Clean Vector from Noisy Observation

For speech signals, we distinguish two acoustic spaces: clean space ($\chi$) where the speech models are trained, and noisy space ($\Psi$) where the recognizer is deployed. The noisy space changes for each utterance to be recognized.

We model speech feature vectors as a mixture of N random Gaussian sources $\{a_i\}$. Clean space is represented by the two Gaussian mixtures. Let the parameters of the Gaussian distributions in clean space or $\chi$ be $\{\mu_i^{\chi}\}$ and $\{\Sigma_i^{\chi}\}$, and the parameters of the Gaussian distributions in noisy space or $\Psi$ be $\{\Psi_i^{\Psi}\}$ and $\{\Sigma_i^{\Psi}\}$. Due to the noise, these distributions may be changed, for example, by a distribution shift. Let the X be the random variable whose realizations are the observations of $\{a_i\}$ in clean space or $\chi$. Let Y be the random variable whose realizations are the observations of $\{a_i\}$ in noisy space or $\Psi$. We have, for clean space:

$$p_X(x) = \sum_{i=1}^{N} N\left(x; \mu_i^X, \sum_i^X\right) Pr(a_i) \tag{1}$$

where N is the number of Gaussian sources or Gaussian distribution, $\mu_i^X$ is the Gaussian in clean space, $Pr(a_i)$ is the probability of the i-th Gaussian source $a_i$, x is realization of the random variable in clean space. For noisy space:

$$p_Y(x) = \sum_{i=1}^{N} N\left(x; \mu_i^\psi, \sum_i^\psi\right) Pr(a_i) \tag{2}$$

where $Pr(a_i)$ is the probability of the i-th Gaussian source $a_i$, which is independent of spaces. The problem is to find an estimate of X, for any given observation of Y. X and Y are random variables. We use the following estimate of X, defined as the conditional expected X given Y:

$$\hat{x} = E\{X \mid Y\} \triangleq \int_x x p_{X|Y}(x \mid y) dx = \sum_{i=1}^{N} \mu_i^X Pr(a_i \mid y) \tag{3}$$

where $\hat{x}$ is estimated clean MFCC and E is expectancy. $Pr(a_i|y)$ can be expressed in terms of conditional probability of y:

$$Pr(a_i \mid y) = \frac{p_Y(y \mid a_i) \times Pr(a_i)}{\sum_{i=1}^{N} p_Y(y \mid a_i) \times Pr(a_i)} \tag{4}$$

Thus $$\hat{x} = \frac{\sum_{i=1}^{N} \mu_i^X p_Y(y \mid a_i) \times Pr(a_i)}{\sum_{i=1}^{N} p_Y(y \mid a_i) \times Pr(a_i)} \tag{5}$$

In equation 5, $p_y(y|a_i)$ is the likelihood of observing y given the mixture component of $a_i$. We generalize equation 5 by raising $p_y(y|a_i) \times Pr(a_i)$ to the power →. In practice, $p_y(y|a_i)$ and $Pr(a_i)$ are represented in a logarithimic scale. To reduce the computation, the sum in equation 5 can be limited to the terms in which $\log p_y(y|a_i)$ is larger than a pre-determined threshold h. Equation 5 thus becomes $$\hat{x} = \frac{\sum_{i \in [1,N], \log p_Y(y|a_i) > \theta} \mu_i^X \exp[\alpha(\log p_Y(y \mid a_i) + \log Pr(a_i))]}{\sum_{i \in [1,N], \log p_Y(y|a_i) > \theta} \exp[\alpha(\log p_Y(y \mid a_i) + \log Pr(a_i))]} \tag{6}$$

Probability Density Functions

To make use of equation 6, we need the parameters of the two mixture densities Eq-1 and Eq-2.

The clean space mixture density function (Eq-1) is trained off-line, by some appropriate procedure (e.g., B. Juang, "Maximum-likelihood Estimation of Mixture Multi-variate Stochastic Observations of Markov Chains," *Bell System Technical Journal*, 1985, Vol. 64, pp. 391–408) and is characterized by $\mu_\epsilon^X$, $\Sigma_i^X$ and $Pr(a_i)$.

The noisy space mixture density function is generated from the clean space mixture density function and the noise power spectrum.

The power spectrum of the noisy speech vector can be expressed as:

$$X^{\Psi,P} = X^{\chi,P} + N^P \tag{7}$$

where superscript P indicates the power spectral domain. According to this relation and ignoring the effects of variance on the estimate, we have:

$$\mu_i^{\Psi,P} = \mu_i^{\chi,P} + \tilde{\mu}^P \tag{8}$$

where $\tilde{\mu}^P$ denotes the power spectrum of the noise.

Figure 2:
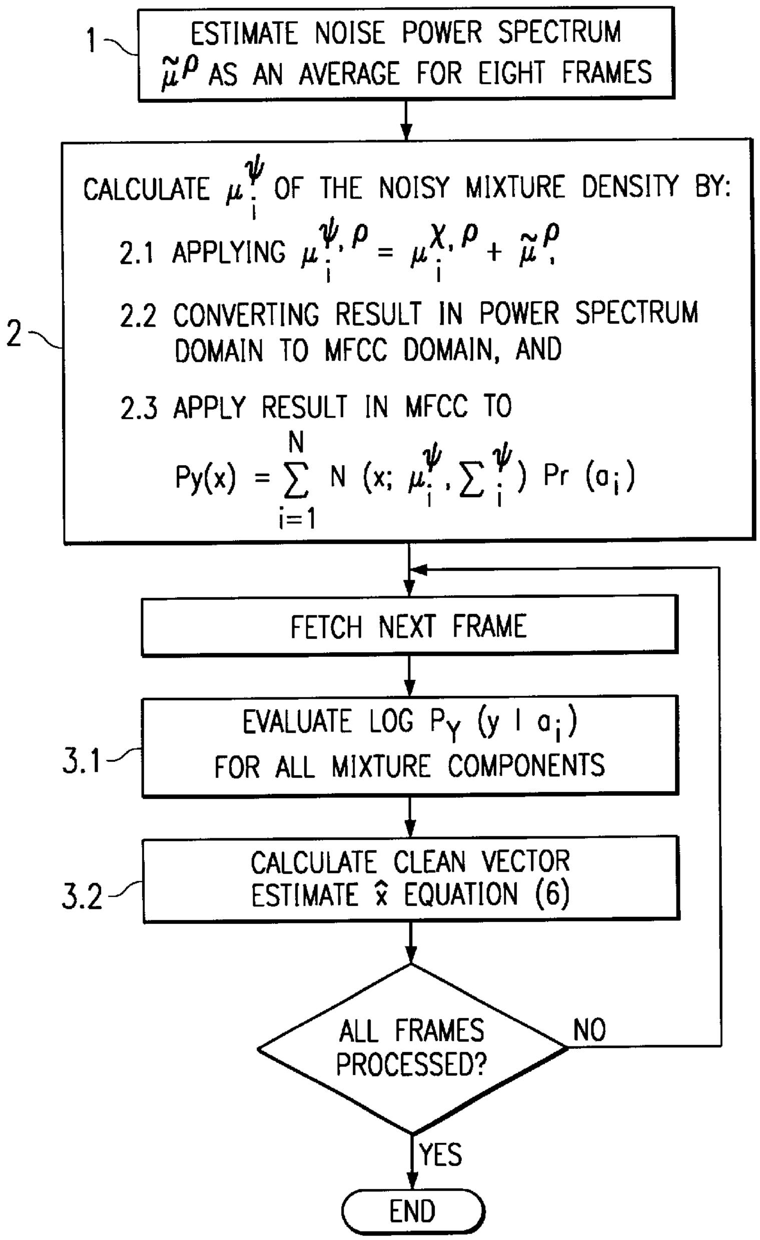
FIG. 2 is a flow chart of the system according to the present invention.

Referring to FIG. 2, there is illustrated the processing steps. For each speech utterance, the following steps are performed to produce the estimated clean feature vector sequence.

Step 1: Estimate noise power spectrum $\tilde{\mu}^P$ as the average of the first eight frames.

Step 2: Calculate $\mu_i^\Psi$ of the noisy mixture density by:

Step 2.1: Applying equation 8 of $\mu_i^{\Psi,P} = \mu_i^{\chi,P} + \tilde{\mu}^P$ where $\mu_i^{\Psi,P}$ is the power spectrum in noisy mixture of clean space $\mu_i^{\chi,P}$+noise power spectrum $\tilde{\mu}^P$.

Step 2.2: Convert result of Step 2.1 in power spectrum domain to MFCC domain.

Step 2.3 Apply result in MFCC domain to $$p_y(x) = \sum_{i=1}^{N} N\left(x; \mu_i^\psi, \sum_i^\psi\right) Pr(a_i)$$

where $Pr(a_i)$ is the probability of the i-th Gaussian source $a_i$, x is realization of random variable in MFCC space, $\mu_i^\Psi$ is and $\Sigma_i^\Psi$ are the parameters of the Gaussian distributions in $\Psi$ (noisy space), N is number of Gaussian sources to get the noisy mixture density for a frame.

Step 3: Repeat until every frame y is processed:

Step 3.1: Sample input speech to produce a frame, generate noisy feature vector for each frame and calculate $\log p_y(y|a_i)$ for all mixture components which is the likelihood of observing y given the mixture component of $a_i$.

Step 3.2: Calculate clean vector estimate $\hat{x}$ by equation 6.

Performance Evaluation

The TIDIGITS database, down-sampled to 8 kHz, is used for all the experiments. The digit sequences have 1–7 digits. The observation vectors consist of 10 DFT mel-frequency cepstral coefficients (MFCC) along with their regression-based first-order time derivative, derived at a frame rate of 20 ms.

We used the 10 first (alphabetically) male and 10 female speakers of the TIDIGITS database test part for evaluation. In this test set, there are 1338 utterances and 3645 words in total.

The additive noise used in the experiments is the background noise recorded in a car driven on highway. The noise was scaled and added to the test and adaptation data to simulate 0 dB signal-to-noise ratio (SNR) condition.

The estimate of the noise power spectrum is estimated as the average of the 8 noise-only frames immediately preceding each speech utterance.

The tests used speaker-independent mode. Without compensation the recognizer gives 31.9% on the test set. With the Gaussian mixture based feature estimation method, a word error rate (WER) 2.66% WER is observed, which corresponds to a 92% reduction of WER.

I claim:

1. A method of speech recognition operating under noisy conditions comprising:

producing an estimated clean feature vector from a noisy feature vector comprising the steps for each frame of:

(a) calculating estimate of noise power spectrum $\tilde{\mu}^P$ as an average over a set of frames, (b) calculating noisy space $\mu_i^{\Psi,P}$ of the noisy mixture density, (c) for every frame (1) sampling input speech to produce frames;

(2) generating a noisy feature vector for each frame;

(3) calculating log $P_Y(y|\alpha_i)$ where $P_Y(y|a_i)$ is the likelihood of observing y in given mixture component of $a_i$ for all mixture components, and (4) calculate clean vector estimate according to:

$$\hat{x} = \frac{\sum_{i\in[1,N],\log p_Y(y|a_i)>\theta} \mu_i^X \exp[\alpha(\log p_Y(y \mid a_i) + \log Pr(a_i))]}{\sum_{i\in[1,N],\log p_Y(y|a_i)>\theta} \exp[\alpha(\log p_Y(y \mid a_i) + \log Pr(a_i))]}; \text{ and}$$

applying said clean vector estimate to a speech recognizer for providing recognized speech.

2. The method of claim 1, wherein said generating noisy feature vector step includes a mel-frequency cepstral coefficient processor.

3. A method of speech recognition operating under noisy conditions comprising:

producing an estimated clean feature vector from a noisy feature vector comprising the steps for each frame of:

(a) calculating estimate of noise power spectrum $\tilde{\mu}^P$ as an average over a set of frames, (b) calculating noisy space $\mu_i^{\Psi,P}$ of the noisy mixture density, for every frame (1) sampling input speech to produce frames;

(2) generating a noisy feature vector for each frame;

(3) calculating log $P_Y(y|a_i)$ where $P_Y(y|a_i)$ is the likelihood of observing y in given mixture component of $a_i$ for all mixture components, and (4) calculate clean vector estimate as a weighted average of the mean vectors of the Gaussian distributions of the clean space, where weights are proportional to the likelihood of the noisy vector measured on noisy speech mixture models; and applying said clean vector estimate to a speech recognizer for providing recognized speech.

4. The method of claim 3 wherein said noisy speech mixture models are obtained by modifying the clean mixture model Gaussian mean vectors according to a noise estimate wherein said calculating step (b) includes the steps of applying $\mu_i^{\Psi,P}=\mu_i^{\chi,P}+\tilde{\mu}^P$, where $\tilde{\mu}^P$ is power spectrum of noise and $\mu_i^{\chi,P}$ is power spectrum of clean space.

5. The method of claim 3, wherein said calculating step (b) includes the steps of applying $\mu_i^{\Psi,P}=\mu_i^{\chi,P}+\tilde{\mu}^P$, where $\tilde{\mu}^P$ is power spectrum of noise and $\mu_i^{\Psi,P}$ is the power spectrum of clean space;

converting the result in power spectrum domain to MFCC domain; and applying result in MFCC to $$P_Y(x) = \sum_{i=1}^{N} N\left(x; \mu_i^{\psi}, \sum\nolimits_i^{\psi}\right) Pr(a_i)$$

where $Pr(a_i)$ is the probability of the i-th Gaussian source $a_i$, x is realization of random variable in MFCC space, $\mu_i^{\Psi}$ is and $\Sigma_i^{\Psi}$ are the parameters of the Gaussian distributions in $\Psi$ (noisy space), N is number of Gaussian sources.

6. A speech recognition system operating under noisy conditions comprising:

a sampler responsive to input speech for sampling said speech to generate frames, a feature vector processor responsive to said frames to generate feature vectors, an estimate clean feature vector processor responsive to said feature vectors to generate estimated clean feature vectors by two Gaussian mixtures wherein a first one is trained on clean speech and the second is derived from the first and by calculating estimate of clean speech feature vector on the conditional expectancy of clean speech given an observed noisy vector, and a speech recognizer response to said estimated clean feature vectors for providing recognized speech.

7. The system of claim 6, wherein said feature vector processor is a mel-frequency cepstral coefficient processor.

8. The system of claim 6, wherein said clean feature processor calculates estimate of noise power spectrum over a set of frames, calculates noisy space $\mu_i^{\Psi,P}$ of the noisy mixture density, and for every frame, after calculating the likelihood of observing y given the mixture component of $a_i$ and calculating clean vector estimate.

9. A method of speech recognition comprising the steps of:

sampling the input speech to produce sampled frames;

generating feature vectors for each frame;

generating an estimate of clean speech vector from said feature vector using a first Gaussian mixture trained on clean speech and a second Gaussian mixture derived from the first using noise samples and generating an estimate of clean speech as a conditional expectancy of clean speech given said two Gaussian mixtures; and applying said estimate of clean speech vector to a speech recognizer to provide recognized speech.

* * * * *